US009406196B2

(12) United States Patent
Asher et al.

(10) Patent No.: US 9,406,196 B2
(45) Date of Patent: Aug. 2, 2016

(54) REAL-TIME INTERACTIVE WAGERING ON EVENT OUTCOMES

(75) Inventors: Joseph M. Asher, New York, NY (US); Howard W. Lutnick, New York, NY (US)

(73) Assignee: CANTOR INDEX, LLC, New York, NY (US)

(*) Notice: Subject to any disclaimer, the term of this patent is extended or adjusted under 35 U.S.C. 154(b) by 2263 days.

(21) Appl. No.: 11/850,213

(22) Filed: Sep. 5, 2007

(65) Prior Publication Data

US 2007/0298871 A1 Dec. 27, 2007

Related U.S. Application Data

(62) Division of application No. 10/410,197, filed on Apr. 10, 2003, now Pat. No. 7,341,517.

(51) Int. Cl.

*G06F 17/00* (2006.01)
*G06F 19/00* (2011.01)
*G07F 17/32* (2006.01)
*G06Q 50/34* (2012.01)

(52) U.S. Cl.

CPC ............ *G07F 17/3244* (2013.01); *G06Q 50/34* (2013.01); *G07F 17/3288* (2013.01)

(58) Field of Classification Search

CPC .... G06Q 40/04; G06Q 50/34; G07F 17/3288; G07F 17/32; G07F 17/3225; G07F 17/3227; G07F 17/323; G07F 17/3244; G07F 17/3255
USPC ........................................................... 463/25
See application file for complete search history.

(56) References Cited

U.S. PATENT DOCUMENTS 4,322,612 A 3/1982 Lange
4,592,546 A 6/1986 Fascenda et al.

(Continued)

FOREIGN PATENT DOCUMENTS

EP 0636965 2/1995
GB 2 379 616 4/2001

(Continued)

OTHER PUBLICATIONS

USPTO Office Action for U.S. Appl. No. 11/146,663, Oct. 3, 2008 (7 pp.).

(Continued)

*Primary Examiner* — Milap Shah
(74) *Attorney, Agent, or Firm* — Mark Miller

(57) ABSTRACT

Systems and methods for real-time interactive wagering on event outcomes are presented. Clients are first qualified and given wagering limits before being allowed to interactively wager on event outcomes. Event outcomes may be based on, for example, financial markets and indices, sporting and entertainment events, casino games, casino performances, and natural phenomena such as weather and earthquakes. Events on which wagers can be placed include both those with known and unknown outcome probabilities, and wagers can be a fixed-odds type or a spread-bet type. Wager transactions, including acceptances and confirmations, are executed in real time. Clients can customize displays of events on which they are authorized to wager. Real-time client credit management, automatic dealer hedging, automatic price-spread adjustments, and automatic client and dealer defined wagering limits are also provided.

60 Claims, 9 Drawing Sheets

(56) References Cited

U.S. PATENT DOCUMENTS 4,679,143 A 7/1987 Hagiwara
4,749,785 A 6/1988 Thiem et al.
4,760,527 A 7/1988 Sidley
4,764,666 A 8/1988 Bergeron
4,882,473 A 11/1989 Bergeron et al.
5,077,665 A 12/1991 Silverman et al.
5,136,501 A 8/1992 Silverman et al.
5,159,549 A 10/1992 Hallman, Jr. et al.
5,276,312 A 1/1994 McCarthy
5,277,424 A 1/1994 Wilms
5,283,734 A 2/1994 Von Kohorn
5,347,452 A 9/1994 Bay, Jr.
5,375,055 A 12/1994 Togher et al.
5,414,838 A 5/1995 Kolton et al.
5,555,354 A 9/1996 Strasnick et al.
5,575,474 A 11/1996 Rossides
5,632,009 A 5/1997 Rao et al.
5,636,843 A 6/1997 Roberts
5,674,128 A 10/1997 Holch
5,689,651 A 11/1997 Lozman
5,713,793 A 2/1998 Holte
5,713,795 A 2/1998 Kohorn
5,728,002 A 3/1998 Hobert
5,749,785 A 5/1998 Rossides
5,762,552 A 6/1998 Vuong et al.
5,770,533 A * 6/1998 Franchi ........................... 463/42
5,774,878 A 6/1998 Marshall
5,779,549 A 7/1998 Walker et al.
5,791,989 A * 8/1998 Slinkman ........................ 463/12
5,800,268 A 9/1998 Molnick
5,842,921 A 12/1998 Mindes et al.
5,946,666 A 8/1999 Nevo et al.
5,966,139 A 10/1999 Anupam et al.
6,004,211 A 12/1999 Brenner et al.
6,014,627 A 1/2000 Togher et al.
6,073,115 A 6/2000 Marshall
6,112,189 A 8/2000 Rickard et al.
6,126,543 A 10/2000 Friedman
6,135,881 A 10/2000 Abbott et al.
6,151,610 A 11/2000 Senn et al.
6,188,403 B1 2/2001 Sacerdoti et al.
6,210,275 B1 4/2001 Olsen
6,222,540 B1 4/2001 Sacerdoti
6,224,486 B1 5/2001 Walker et al.
6,236,900 B1 5/2001 Geiger
6,241,608 B1 6/2001 Torango
6,272,474 B1 8/2001 Garcia
6,321,212 B1 * 11/2001 Lange ......................... 705/36 R
6,400,366 B1 6/2002 Davies et al.
6,435,968 B1 8/2002 Torango
6,443,841 B1 9/2002 Rossides
6,456,982 B1 9/2002 Pilipovic
6,464,583 B1 10/2002 Kidron
6,493,681 B1 12/2002 Tertitski et al.
6,508,710 B1 1/2003 Paravia et al.
6,527,270 B2 3/2003 Maksymec et al.
6,611,808 B1 8/2003 Preti et al.
6,629,890 B2 10/2003 Johnson
6,684,190 B1 1/2004 Power et al.
6,707,454 B1 3/2004 Barg et al.
6,712,695 B2 3/2004 Mothwurf et al.
6,792,615 B1 9/2004 Rowe et al.
6,811,488 B2 11/2004 Paravia et al.
6,839,686 B1 1/2005 Galant
6,990,238 B1 1/2006 Saffer et al.
6,993,504 B1 1/2006 Friesen et al.
7,042,471 B2 5/2006 Glass et al.
7,043,449 B1 5/2006 Li et al.
7,068,267 B2 6/2006 Meanor et al.
7,069,056 B2 6/2006 Iwata et al.
7,079,142 B2 7/2006 Chiu et al.
7,113,190 B2 9/2006 Heaton
7,181,423 B2 2/2007 Blanchard et al.
7,341,517 B2 3/2008 Asher et al.
7,376,608 B1 5/2008 Dellinger et al.
7,383,218 B1 6/2008 Oros
7,751,584 B2 7/2010 Zimmer et al.
7,801,784 B2 9/2010 Bandman et al.
7,890,396 B2 2/2011 Weinstein
7,937,309 B2 5/2011 Bandman et al.
8,088,000 B2 1/2012 Ginsberg et al.
8,117,068 B2 2/2012 Shuster et al.
8,131,618 B2 3/2012 Weinstein
8,562,422 B2 10/2013 Lutnick et al.
8,615,456 B2 12/2013 Weinstein
8,764,553 B2 7/2014 Ginsberg et al.
2001/0004609 A1 6/2001 Walker et al.
2001/0014874 A1 8/2001 Iida et al.
2001/0030395 A1 * 10/2001 Sunday ......................... 273/278
2001/0031663 A1 10/2001 Johnson
2002/0004774 A1 1/2002 Defarto
2002/0026404 A1 2/2002 Thompson
2002/0038270 A1 3/2002 Shin et al.
2002/0049975 A1 4/2002 Thomas et al.
2002/0055899 A1 5/2002 Williams
2002/0070937 A1 6/2002 Bertram et al.
2002/0073017 A1 6/2002 Robertson
2002/0073021 A1 6/2002 Ginsberg et al.
2002/0094869 A1 * 7/2002 Harkham ........................ 463/42
2002/0099640 A1 7/2002 Lange
2002/0111761 A1 8/2002 Edgecombe et al.
2002/0120551 A1 8/2002 Jones, III
2002/0130868 A1 9/2002 Smith
2002/0133449 A1 9/2002 Segal et al.
2002/0147670 A1 10/2002 Lange
2002/0147671 A1 10/2002 Sloan et al.
2002/0151365 A1 10/2002 Walker et al.
2002/0152150 A1 10/2002 Cooper et al.
2002/0155884 A1 10/2002 Updike
2002/0155885 A1 10/2002 Shvili
2002/0188546 A1 12/2002 Tang
2002/0194102 A1 12/2002 Suganuma
2002/0194114 A1 12/2002 Erdmier
2003/0009399 A1 1/2003 Boerner
2003/0009411 A1 1/2003 Ram et al.
2003/0069834 A1 4/2003 Cutler
2003/0070178 A1 * 4/2003 Boyd et al. .................... 725/110
2003/0074292 A1 4/2003 Masuda
2003/0087701 A1 5/2003 Paravia et al.
2003/0088492 A1 5/2003 Damschroder
2003/0110120 A1 6/2003 Salehi
2003/0119579 A1 * 6/2003 Walker et al. ................... 463/20
2003/0120835 A1 6/2003 Kale et al.
2003/0139989 A1 7/2003 Churquina
2003/0190944 A1 10/2003 Manfredi et al.
2003/0195841 A1 10/2003 Ginsberg et al.
2003/0199313 A1 10/2003 Gonen
2004/0027350 A1 2/2004 Kincaid et al.
2004/0041846 A1 3/2004 Hurley et al.
2004/0100467 A1 5/2004 Heaton
2004/0104845 A1 * 6/2004 McCarthy ..................... 342/463
2004/0128157 A1 7/2004 Aquilino et al.
2004/0128225 A1 7/2004 Thompson et al.
2004/0133500 A1 7/2004 Thompson et al.
2004/0193469 A1 * 9/2004 Amaitis et al. .................... 705/8
2005/0021443 A1 1/2005 Beard et al.
2005/0044026 A1 2/2005 Leistner
2005/0075965 A1 4/2005 Cutler
2005/0075966 A1 4/2005 Duka
2005/0102208 A1 5/2005 Gudgeon et al.
2005/0125328 A1 6/2005 Schluetter
2005/0171881 A1 8/2005 Ghassemieh et al.
2005/0177498 A1 8/2005 Tenorio
2005/0209001 A1 * 9/2005 Moshal ........................... 463/42
2005/0228735 A1 10/2005 Duquette
2005/0234799 A1 10/2005 Hansen et al.
2005/0234821 A1 10/2005 Benham et al.
2005/0245305 A1 11/2005 Asher et al.
2005/0255919 A1 11/2005 Nelson
2005/0256795 A1 11/2005 Markov et al.
2005/0256797 A1 11/2005 Tyulyaev
2005/0261999 A1 11/2005 Rowady, Jr.
2005/0264472 A1 12/2005 Rast
2005/0273408 A1 12/2005 Bandman et al.

(56) References Cited

U.S. PATENT DOCUMENTS

| | | | |
|---|---|---|---|
| 2006/0010066 | A1 | 1/2006 | Rosenthal et al. |
| 2006/0059065 | A1 | 3/2006 | Ginsberg et al. |
| 2006/0069635 | A1 | 3/2006 | Ram et al. |
| 2006/0095363 | A1 | 5/2006 | May |
| 2006/0111997 | A1 | 5/2006 | Abbott et al. |
| 2006/0155627 | A1 | 7/2006 | Horowitz |
| 2006/0155628 | A1 | 7/2006 | Horowitz |
| 2006/0235786 | A1 | 10/2006 | DiSalvo |
| 2006/0241949 | A1 | 10/2006 | Tobias et al. |
| 2006/0259394 | A1 | 11/2006 | Cushing et al. |
| 2006/0259413 | A1 | 11/2006 | Friesen et al. |
| 2007/0005481 | A1 | 1/2007 | Kedia et al. |
| 2007/0038543 | A1 | 2/2007 | Weinstein |
| 2007/0100718 | A1 | 5/2007 | Gilbert et al. |
| 2008/0081684 | A1 | 4/2008 | Lutnick |
| 2008/0200242 | A1 | 8/2008 | Ginsberg et al. |
| 2009/0096165 | A1 | 4/2009 | Asher et al. |
| 2010/0299632 | A1 | 11/2010 | Bandman et al. |
| 2011/0137783 | A1 | 6/2011 | Weinstein |
| 2011/0145134 | A1 | 6/2011 | Bandman et al. |
| 2012/0021814 | A1 | 1/2012 | Gurovich |
| 2013/0254146 | A1 | 9/2013 | Ellis et al. |
| 2015/0243123 | A1 | 8/2015 | Borissov |

FOREIGN PATENT DOCUMENTS

| | | |
|---|---|---|
| JP | H07-36647 | 7/1995 |
| JP | 10-21312 A | 1/1998 |
| JP | H11-203354 | 7/1999 |
| JP | 2002-215901 | 1/2001 |
| JP | 2002-109226 | 4/2002 |
| JP | 2002-183451 | 6/2002 |
| JP | 2002-230300 | 8/2002 |
| JP | 2002-366853 | 12/2002 |
| JP | 2002-373042 | 12/2002 |
| JP | 2002-541588 | 12/2002 |
| JP | 2003-515274 | 4/2003 |
| JP | 2003-187078 | 7/2003 |
| JP | 2003-521076 | 7/2003 |
| JP | 2003-348482 | 12/2003 |
| JP | 2004-94678 | 3/2004 |
| JP | 2007-524941 | 8/2007 |
| WO | WO 97/01145 | 1/1997 |
| WO | WO 97/09699 | 3/1997 |
| WO | WO 97/28636 | 8/1997 |
| WO | WO 00/40313 | 7/2000 |
| WO | WO/00/62187 | 10/2000 |
| WO | WO 00/67215 | 11/2000 |
| WO | WO 01/15450 | 3/2001 |
| WO | WO 01/37494 | 5/2001 |
| WO | WO/01/55968 | 8/2001 |
| WO | WO 01/69344 | 9/2001 |
| WO | WO 02/27675 | 4/2002 |
| WO | WO 03/087994 | 10/2003 |
| WO | WO 01/78405 | 10/2004 |
| WO | WO 2005/072506 | 8/2005 |
| WO | WO/2005/109281 | 11/2005 |
| WO | WO/2006/096851 | 9/2006 |

OTHER PUBLICATIONS

USPTO Office Action for U.S. Appl. No. 11/536,430, Oct. 7, 2008 (9 pp.).

International Search Report for Application No. PCT/US07/79827, mailed Apr. 17, 2008.

USPTO Office Action for U.S. Appl. No. 11/146,663, Aug. 5, 2009 (10 pages).

USPTO Office Action for U.S. Appl. No. 11/425,368, Feb. 19, 2009 (8 pages).

USPTO Examiner Interview Summary for U.S. Appl. No. 11/425,368, Oct. 30, 2009 (3 pages).

USPTO Office Action for U.S. Appl. No. 09/846,025, May 18, 2007 (12 pages).

USPTO Office Action for U.S. Appl. No. 09/846,025, Dec. 20, 2007 (7 pages).

USPTO Office Action for U.S. Appl. No. 09/846,025, Feb. 24, 2009 (8 pages).

USPTO Examiner's Answer to Appeal Brief for U.S. Appl. No. 09/846,025, Jan. 25, 2010 (15 pages).

USPTO Office Action for U.S. Appl. No. 10/410,197, Jan. 18, 2007 (5 pages).

USPTO Office Action for U.S. Appl. No. 11/536,430, Sep. 24, 2009 (18 pages).

*Betting on the Weather*, N.Y. Times, published May 21, 1908 (1 page).

Australian Examiner's Report for Application No. 2005253141, dated Jan. 20, 2010 (2 pages).

USPTO Notice of Allowance and Fees Due for U.S. Appl. No. 11/425,368, Mar. 15, 2010 (9 pages).

USPTO Pre-Brief Appeal Conference Decision for U.S. Appl. No. 11/536,430, Apr. 21, 2010 (2 pages).

International Preliminary Report on Patentability for International Application No. PCT/US/06/24170, dated Dec. 24, 2007 (5 pages).

International Preliminary Report on Patentability for International Application No. PCT/US07/71651, dated Dec. 22, 2008 (5 pages).

Supplementary European Search Report for Application No. EP 06785277, mailed Nov. 24, 2008 (4 pages).

European Communication for Application No. EP 06785277, mailed Mar. 6, 2009 (1 page).

Canadian Office Action for Application No. 2407679, mailed Dec. 12, 2008 (5 pages).

UK Examination Report for Application No. GB 0226984.3, dated Sep. 24, 2003 (4 pages).

UK Search Report for Application No. GB 0406872.2, dated Jun. 7, 2004 (4 pages).

UK Examination Report for Application No. GB 0406872.2, dated Nov. 30, 2005 (4 pages).

International Preliminary Report on Patentability for International Application No. PCT/US07/79827, dated Mar. 31, 2009 (4 pages).

USPTO Notice of Allowance and Fees Due and Examiner Interview Summary for U.S. Appl. No. 11/146,663, Jun. 10, 2010 (11 pages).

Orla O'Sullivan. (May 1997). Back to command & control. American Bankers Association. ABA Banking Journal, 89(5), 34-40. Retrieved May 15, 2010, from ABI/INFORM Global. (Document ID: 12254695).

Integrated Real-Time Stock Data Now Free at 3DStockCharts.com. (Jul. 1, 2003). PR Newswire, 1. Retrieved May 15, 2010, from Business Dateline. (Document ID: 353452561).

3DStockCharts Now Free. (Jun. 1, 2004). Business Wire, 1. Retrieved May 15, 2010, from Business Dateline. (Document ID: 644939771 ).

Canadian Office Action for Application No. 2460367, mailed May 14, 2010 (4 pages).

Australian Examiner's Report for Application No. 2007299959, dated Jun. 2, 2010 (3 pages).

USPTO Office Action for U.S. Appl. No. 12/106,147, May 17, 2010 (6 pages).

International Preliminary Report on Patentability for International Application No. PCT/US05/19935, dated Apr. 3, 2007 (4 pages).

USPTO Office Action for U.S. Appl. No. 12/106,147, Jun. 28, 2010 (6 pages).

International Preliminary Examination Report for International Application No. PCT/US01/13683, dated Mar. 26, 2007 (3 pages).

Declaration for International Application No. PCT/US01/13683, dated Mar. 21, 2002 (3 pages).

U.S. Appl. No. 12/851,620, filed Aug. 6, 2010, Inventors: Jeffrey M. Bandman et al., entitled "System and Method for Managing Financial Market Data With Hidden Information" (42 pages).

USPTO Notice of Allowance and Fees Due and Examiner Interview Summary for U.S. Appl. No. 11/146,663, Aug. 10, 2010 (16 pages).

Fischer et al. ("Security Analysis and Portfolio Management"; fifth edition; 1991; Prentice Hall; Englewood Cliffs, NJ 07632); ISBN 0-13-799149-5.

Day Trading Stop loss "Stop Loss Placement"—www.geocities.com/daytradingtutor/trading-stop-loss.htm.

(56) References Cited

OTHER PUBLICATIONS

"The Most Powerful ATM card on the Planet", http://www.prepaidatm.com, copyright 2001, printed Feb. 19, 2003, 1pg.
"Stop Loss—How to Limit your Spread Bet Liability", @bout spread betting, http:/www.about-spread-betting.com.uk/spread_bet_stop_loss.htm, copyright 2002, printed Feb. 20, 2003, 2pp.
"Prepaid gift card", Southwestmart, http://www.southwestmart.com/giftcard.htm, copyright 2002.
"Longitude, Completing the World's Capital Markets", http://www.longitude.com/index.html, copyright 2003, printed Apr. 10, 2003, 10pp.
Notification of Transmittal of the International Search Report and the Written Opinion of the International Searching Authority for International Application No. PCT/US07/71651; 8 pp.
Notification of Transmittal of the International Search Report and the Written Opinion of the International Searching Authority for International Application No. PCT/US/06/24170; 8 pp.
PCT Notification of Transmittal of the International Search Report and Written Opinion; International Application No. PCT/US05/19935; 8 pp.
Holland (Malcolm Holland), "It's a weird and wonderful world—You can bet on it", QNP, Nov. 27, 1992.
USPTO Office Action for U.S. Appl. No. 11/425,368, Apr. 7, 2008 (9 pages).
USPTO Office Action for U.S. Appl. No. 09/846,025, Aug. 31, 2005 (28 pages).
USPTO Office Action for U.S. Appl. No. 09/846,025, Jun. 23, 2006 (28 pages).
USPTO Office Action for U.S. Appl. No. 09/846,025, Jul. 9, 2008 (9 pages).
USPTO Office Action for U.S. Appl. No. 10/404,043, Feb. 14, 2006 (17 pages).
USPTO Office Action for U.S. Appl. No. 10/404,043, Aug. 14, 2006 (10 pages).
USPTO Advisory Action for U.S. Appl. No. 10/404,043, Oct. 20, 2006 (3 pages).
USPTO Office Action for U.S. Appl. No. 10/404,043, Feb. 5, 2007 (11 pages).
USPTO Office Action for U.S. Appl. No. 10/404,043, Oct. 10, 2007 (13 pages).
USPTO Office Action for U.S. Appl. No. 10/410,197, May 10, 2007 (6 pages).
USPTO Notice of Allowance for U.S. Appl. No. 10/410,197, Oct. 17, 2007 (4 pages).
USPTO Office Action for U.S. Appl. No. 11/146,663, Dec. 13, 2007 (7 pages).
USPTO Notice of Allowance and Fees Due for U.S. Appl. No. 11/425,368, Sep. 29, 2010 (7 pages).
USPTO Office Action for U.S. Appl. No. 12/339,764, Oct. 25, 2010 (12 pages).
USPTO Supplemental Notice of Allowance and Fees Due for U.S. Appl. No. 11/425,368, Dec. 6, 2010 (4 pages).
USPTO Office Action for U.S. Appl. No. 09/846,025, Dec. 6, 2010 (4 pages).
USPTO Examiner Interview Summary for U.S. Appl. No. 12/339,764, Nov. 30, 2010 (12 pages).
Australian Exam Report for Application No. 2006262221, dated Nov. 25, 2010 (2 pages).
USPTO Petition Decision for U.S. Appl. No. 09/846,025, Jan. 30, 2009 (3 pages).
USPTO Office Action for U.S. Appl. No. 09/846,025, Aug. 5, 2010 (2 pages).
USPTO Pre-Brief Appeal Conference Decision for U.S. Appl. No. 09/846,025, Aug. 21, 2009 (4 pages).
USPTO Examiner Interview Summary for U.S. Appl. No. 12/851,620, Oct. 8, 2010 (3 pages).
USPTO Examiner Interview Summary for U.S. Appl. No. 12/851,620, Nov. 4, 2010 (4 pages).
USPTO Examiner Interview Summary and Notice of Allowance and Fees Due for U.S. Appl. No. 12/851,620, Dec. 27, 2010 (14 pages).
USPTO Office Action for U.S. Appl. No. 12/106,147, Jan. 5, 2011 (9 pages).
USPTO Supplemental Notice of Allowability for U.S. Appl. No. 12/851,620, Feb. 16, 2011 (4 pages).
European Communication and Extended Search Report for Application No. EP 07853670.3, mailed May 12, 2011 (6 pages).
Japanese Office Action with English Translation for Application No. 2007-527642, mailed May 17, 2011 (8 pages).
USPTO Office Action for U.S. Appl. No. 13/036,173, Aug. 9, 2011 (12 pages).
USPTO Office Action for U.S. Appl. No. 13/036,173, Aug. 29, 2011 (14 pages).
USPTO Notice of Allowance and Fees Due for U.S. Appl. No. 12/106,147, Aug. 26, 2011 (7 pages).
European Communication and Supplementary Search Report for Application No. 05757385.9, dated Aug. 23, 2011 (7 pages).
USPTO Office Action for U.S. Appl. No. 09/846,025, Oct. 19, 2011 (7 pages).
Japanese Office Action with English Translation for Application No. 2008-518358, mailed Nov. 29, 2011 (9 pages).
USPTO Notice of Allowance and Fees Due and Examiner Interview Summary for U.S. Appl. No. 13/026,410, filed Sep. 23, 2011 (14 pages).
Canadian Exam Report for Application No. 2664753, dated Oct. 19, 2011 (3 pages).
U.S. Appl. No. 60/201,038, filed May 1, 2000, Ginsberg et al.
U.S. Appl. No. 60/577,666, filed Jun. 7, 2004, Bandman et al.
U.S. Appl. No. 60/692,178, filed Jun. 20, 2005, Bandman et al.
USPTO Office Action for U.S. Appl. No. 13/036,173, Jul. 10, 2012 (13 pages).
Japanese Office Action with English Translation for Application No. 2007-527642, mailed Mar. 13, 2012 (4 pages).
Handout for Briefing for Upcoming Futures and Options Trading System Participants, Japan, Toyko Stock Exchange, Operational System Division, Sep. 1997, pp. 1-18.
USPTO Office Action for U.S. Appl. No. 13/411,884, Jun. 8, 2012 (8 pages).
USPTO Office Action for U.S. Appl. No. 09/846,025, Apr. 30, 2012 (11 pages).
USPTO Office Action for U.S. Appl. No. 09/846,025, Jul. 16, 2012 (9 pages).
USPTO Office Action for U.S. Appl. No. 13/338,539, Aug. 27, 2012 (7 pages).
Canadian Office Action for Application No. 2407679, mailed Mar. 23, 2012 (3 pages).
USPTO Office Action for U.S. Appl. No. 11/850,213, Jun. 1, 2012 (15 pages).
USPTO Office Action for U.S. Appl. No. 11/850,213, Dec. 6, 2012 (3 pages).
Canadian Office Action for Application No. 2460367, mailed Apr. 20, 2012 (4 pages).
Japanese Office Action with English Translation for Application No. 2009-530621, mailed Apr. 18, 2012 (8 pages).
USPTO Office Action for U.S. Appl. No. 13/338,539, Mar. 13, 2013 (10 pages).
USPTO Notice of Panel Decision for U.S. Appl. No. 11/850,213, Feb. 6, 2013 (2 pages).
USPTO Notice of Allowance and Fees Due for U.S. Appl. No. 09/846,025, Apr. 23, 2013 (13 pages).
USPTO Office Action for U.S. Appl. No. 13/036,173, May 17, 2013 (10 pages).
USPTO Office Action for U.S. Appl. No. 13/411,884, May 10, 2013 (6 pages).
Japanese Office Action with English Translation for Application No. 2009-530621, mailed Feb. 6, 2013 (4 pages).
Canadian Office Action for Application No. 2569397, mailed Apr. 25, 2013 (3 pages).
European Office Action for Application No. 05757385.9, dated Mar. 22, 2013, 7 pages.
USPTO Notice of Allowance and Fees Due for U.S. Appl. No. 11/536,430, Jun. 13, 2013 (6 pages).
USPTO Office Action for U.S. Appl. No. 13/609,427, Jun. 5, 2013, 9 pages.

(56) References Cited

OTHER PUBLICATIONS

Canadian Office Action for Application No. 2611000, mailed Jul. 22, 2013 (2 pages).
USPTO Notice of Allowance and Issue Fees Due for U.S. Appl. No. 13/338,539, Sep. 24, 2013 (8 pages).
Canadian Office Action for Application No. 2460367, mailed Sep. 16, 2013 (2 pages).
USPTO Office Action for U.S. Appl. No. 11/850,213, Oct. 1, 2013 (13 pages).
Australian Examiner's Report for Application No. 2011239224, dated Dec. 16, 2013 (2 pages).
Japanese Office Action with English Translation for Application No. 2012-156565, mailed Nov. 12, 2013 (8 pages).
USPTO Notice of Allowance and Fees Due for U.S. Appl. No. 13/411,884, Oct. 21, 2013 (11 pages).
Japanese Office Action with English Translation for Application No. 2012-122495, mailed Oct. 29, 2013 (5 pages).
"Daiwa Direct" course dedicated service credit transaction service, Daiwa Securities, Oct. 4, 2004, p. 23.
Australian Examiner's Report for Application No. 2012201275, dated Oct. 2, 2013 (4 pages).
Canadian Examination Report for Application No. 2,664,753 mailed Nov. 21, 2013, 3 pages.
Japanese Office Action with English Translation for Application No. 2009-530621, mailed Oct. 29, 2013 (6 pages).
Australian Examiner's Report for Application No. 2012254888, dated Feb. 26, 2014 (3 pages).
Canadian Examination Report for Application No. 2,407,679 mailed Feb. 12, 2014, 3 pages.
USPTO Notice of Allowance and Fees Due for U.S. Appl. No. 13/609,427, Jan. 24, 2014, 11 pages.
Australian Notice of Acceptance for Application No. 2011239224, dated Sep. 17, 2015 (9 pages).
Canadian Office Action for Application No. 2,569,397, mailed May 1, 2014 (3 pages).
Canadian Office Action for Application No. 2,569,397, mailed May 21, 2015 (4 pages).
Australian Exam Report for Application No. 2012254888 mailed Apr. 29, 2014 (4 pages).
Canadian Exam Report for Application No. 2,611,000 mailed Nov. 27, 2014 (4 pages).
Japanese Office Action with English Translation for Application No. 2012-122495, mailed Dec. 9, 2014 (6 pages).
Shimoda, et al. Quick Reference of Commodity Futures, Toyo Keizai Inc., Dec. 19, 1996, First Edition, pp. 50-51.
Canadian Notice of Allowance for Application No. 2,407,679 mailed Mar. 23, 2015, 1 page.
Canadian Notice of Allowance for Application No. 2,460,367 mailed Nov. 10, 2015, 1 page.
Canadian Exam Report for Application No. 2,611,000 mailed Feb. 8, 2016 (1 page).
Canadian Exam Report for Application No. 2,407,679 mailed Jun. 25, 2015, 3 pages.
Canadian Notice of Allowance for Application No. 2,407,679 mailed Dec. 18, 2015, 1 page.
Canadian Examination Report for Application No. 2,664,753 mailed Mar. 25, 2015, 5 pages.
Japanese Appeal Decision with English Translation for Application No. 2009-530621, mailed Jun. 30, 2015 (4 pages).

* cited by examiner

500

REAL-TIME INTERACTIVE WAGERING ON EVENT OUTCOMES

This application is a divisional of U.S. patent application Ser. No. 10/410,197, filed Apr. 10, 2003 now U.S. Pat. No. 7,341,517, which is incorporated by reference herein in its entirety.

BACKGROUND OF THE INVENTION

The present invention relates to real-time interactive wagering on event outcomes. Event outcomes may be based on, for example, financial markets and indices, sporting and entertainment events, political events, games of chance, and natural phenomena such as weather and earthquakes. Wagers can be of a fixed-odds type or a spread-bet type (both described further below). Wagers can be placed on, for example, the change in the Consumer Price Index for a given month; a nation's Gross Domestic Product (GDP); a casino's payout or winnings at blackjack over a given period; the team that will win baseball's World Series; the actor that will win an Academy Award; and the price movement of individual stocks, gold, commodities, or any real-time index. Events on which wagers can be placed include both those with known and unknown outcome probabilities. The present invention does not, however, involve trading of financial instruments.

Current wagering systems are often slow and inefficient, and thus do not offer clients real-time wagering. Many known systems conduct wagering manually by telephone. Even known online wagering systems do not offer real-time wagering. Processing delays are commonly incurred between initially placing a wager and receiving confirmation of that wager. For example, after a client places a wager, the client's available credit is usually checked before the wager is accepted and confirmed. During such processing delays, the price of a desired wager can and often does change. Thus clients may not at times get the prices originally presented. Moreover, presented wager prices are typically not current, but often may lag actual prices by as much as 5-10 minutes. Another disadvantage of known wagering systems is their limited selection of events on which to wager. Known systems and methods generally cannot easily establish wagering on customized or client-requested events, such as, for example, the snowfall in New York's Central Park next Christmas Day.

In view of the foregoing, it would be desirable to provide real-time interactive wagering on event outcomes.

It would also be desirable to provide real-time interactive wagering on event outcomes with real-time transaction confirmation.

It would further be desirable to provide real-time interactive wagering on event outcomes with real-time management of client-wagering credit.

It would still further be desirable to provide real-time interactive wagering on event outcomes with automatic wager-tracking indices.

It would yet further be desirable to provide real-time interactive wagering on event outcomes with automatic dealer hedging.

It would also be desirable to provide real-time interactive wagering on event outcomes with automatic price-spread adjustment It would further be desirable to provide real-time interactive wagering on event outcomes with automatic forward price setting.

It would further be desirable to provide real-time interactive wagering on event outcomes with selectable foreign or domestic currencies.

It would further be desirable to provide real-time interactive remote participation in casino events.

It would further be desirable to provide real-time interactive remote wagering on event outcomes with a cap and collar for spread-bet wagering.

SUMMARY OF THE INVENTION

It is an object of this invention to provide real-time interactive wagering on event outcomes.

It is also an object of this invention to provide real-time interactive wagering on event outcomes with real-time transaction confirmation.

It is further an object of this invention to provide real-time interactive wagering on event outcomes with real-time management of client-wagering credit.

It is still further an object of this invention to provide real-time interactive wagering on event outcomes with automatic wager-tracking indices.

It is yet further an object of this invention to provide real-time interactive wagering on event outcomes with automatic dealer hedging.

It is another object of this invention to provide real-time interactive wagering on event outcomes with automatic price-spread adjustments.

It is still another object of this invention to provide real-time interactive wagering on event outcomes with automatic forward price setting.

It is still another object of this invention to provide real-time interactive wagering on event outcomes with selectable foreign or domestic currencies.

It is still another object of this invention to provide real-time interactive remote participation in casino events.

It is yet another object of this invention to provide real-time interactive remote wagering on event outcomes with a cap and collar for spread-bet wagering.

In accordance with this invention, a data processing computer and a plurality of client workstations are provided that communicate interactively via a network. The workstations can be, for example, personal computers, laptop computers, mainframe computers, dumb terminals, personal digital assistants (PDAs), cellular phones, or other portable devices having network capabilities. The network can be, for example, the Internet, an Ethernet, a token ring, a token bus, or any other suitable communications medium or configuration that links the workstations with the data processing computer. The present invention operates interactively with online clients preferably via an Internet Web site.

The present invention preferably provides automatic real-time client credit management, real-time online corroborated wager prices, real-time interactive transaction confirmation, automatic price-spread adjustments, automatic setting of forward pricing, automatic wager-tracking indices, automatic dealer hedging, automatic client and dealer defined wagering limits, and multiple-price wagering. Other features of the present invention include choice of currencies for buying and selling, and provisions for evaluating and establishing wagering on events requested by clients. The present invention can be deployed in a dealer environment in which clients wager with the "house," which acts as dealer, or in a brokerage environment in which clients wager with other clients or combinations of other houses, one or more of the houses acting as broker or another dealer.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention is directed to systems and methods for real-time interactive wagering on event outcomes. The systems and methods of the present invention may be implemented using a data processing computer and a plurality of client workstations that communicate interactively with the computer via a network.

Figure 1:
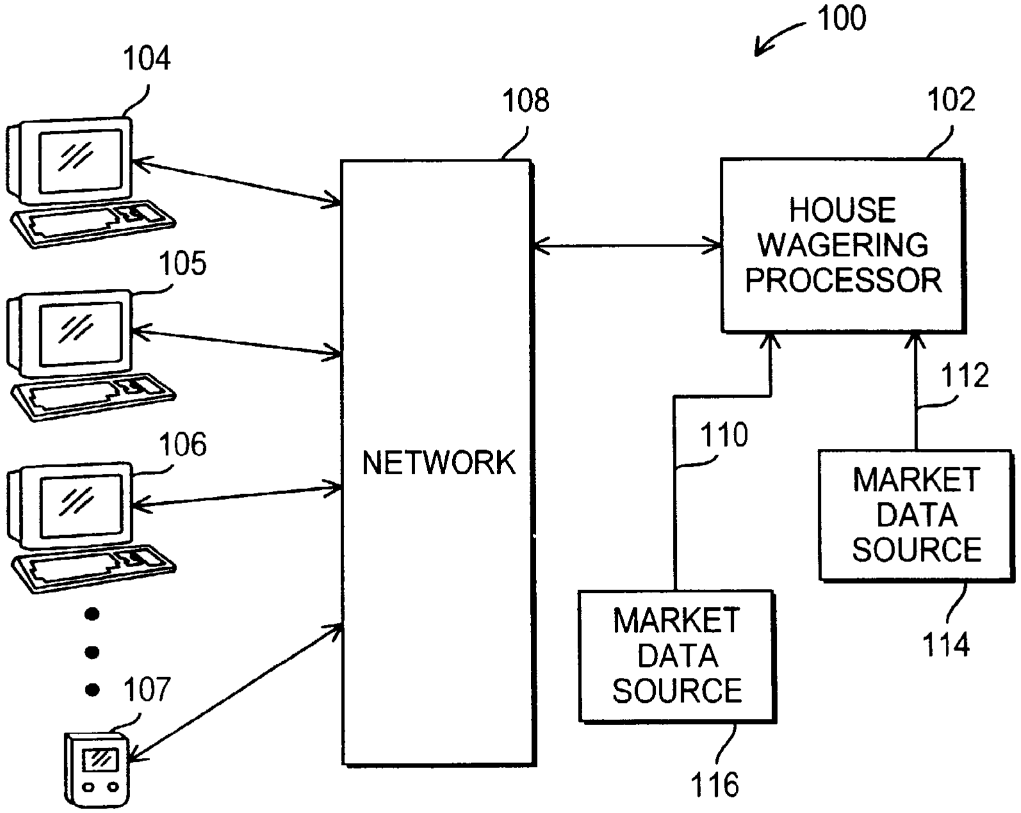
FIG. 1 is a block diagram of a system for real-time interactive wagering in accordance with the present invention.

FIG. 1 illustrates a real-time interactive wagering system 100 according to the present invention. The system includes a house wagering processor 102 and a plurality of client workstations 104-107, all of which are linked together via network 108. Wagering processor 102 can be, for example, a data processing computer having appropriate processing speed and memory capacity. Client workstations 104-107 can be directly or remotely connected to processor 102 and can be, for example, personal computers, dumb terminals, personal digital assistants (PDAs), laptop computers, mainframe computers, cellular telephones with Internet capabilities, or other devices capable of communicating with processor 102 via network 108. Network 108 can be, for example, the Internet, an Ethernet, a token ring, a token bus, or any other suitable communication medium or configuration that links the workstations with processor 102 to provide real-time interaction. In a preferred embodiment, clients preferably interact with the system via an Internet Web site.

Wagering system 100 also includes electronic feeds 110 and 112 each coupled to processor 102 and to respective preferably independent market data sources 114 and 116. As described further below, market data sources 114 and 116 each provide pricing and other information regarding known markets, indices and the like (e.g., S&P 500, stock prices, etc.). Electronic feeds 110 and 112 can be any communication medium that transmits available market data and changes thereof substantially immediately.

An account with "the house" is first opened by establishing credit in any known or appropriate manner. For example, credit may be established by submitting a financial statement or credit report, by authorizing the house to charge a credit card, or by depositing cash or securities with the house. The house is likely to then further qualify a client in accordance with either conventional standards of the financial industry, proprietary standards of the house, or a combination of both.

Qualification standards may be further based on wagering in either a dealer environment, a brokerage environment, or both.

Figure 2:
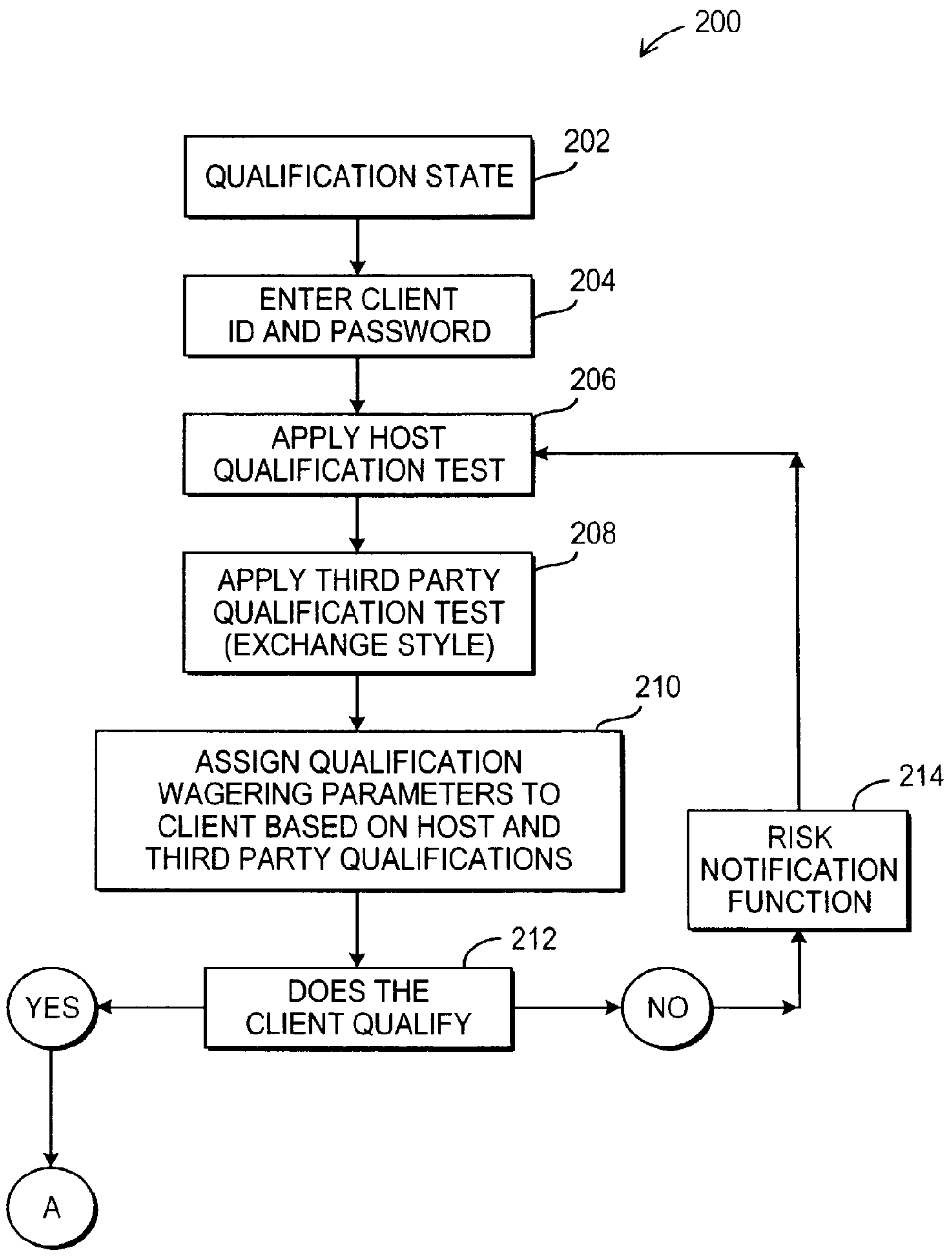
FIG. 2 is a flow diagram of a client qualification process in accordance with the present invention.

FIG. 2 shows an embodiment of a client qualification process according to the present invention. Qualification process 200 begins at qualification state 202 after a client has opened an account and has established a line-of-credit as described above. At 204, the client logs in to the wagering system by entering an identifier (ID) and a password at one of client workstations 104-107. At 206, house wagering processor 102 applies a predetermined house qualification test on the client's line-of-credit and other financial information as deemed appropriate by the house. This test determines whether the client is currently qualified to wager on currently available event outcomes or particular subsets thereof. At 208, the house wagering system preferably applies a third-party qualification test for wagering in one or more brokerage environments. After applying the house and third-party qualification tests, wagering parameters are assigned to the client at 210. These wagering parameters can include, for example, the types of available event outcomes, available third-parties, and associated wagering minimums. At 212, the wagering system determines whether the client qualifies to participate in wagering based on the assigned wagering parameters and the client's current financial situation. If qualified, the client can proceed to wager on selected event outcomes. If the client does not qualify, the system performs a risk notification function at 214. The client may then be informed of the non-qualification. Additionally or alternatively, the risk notification function may alert the house that further scrutiny of that client's credentials is required. The system then returns to host qualification test 206 where, if any deficiencies had been corrected by the client or modifications made by the house, the qualification tests are reapplied.

Once credit is established and the client is qualified to wager, the system automatically manages that credit in real time, and presents to a client—before any wagers are placed—only an amount the client is currently authorized to wager. For example, if a client is authorized to wager $1000 and wagers $1000 that the Dow Jones Industrial Average (DJIA) will rise to a certain value by a certain date, and then on another event collects $1500 from a matured wager, the system automatically updates the client's credit in real time to authorize the client to wager another $500. The system will not permit a client to wager more than that client's authorized amount.

Moreover, the system preferably presents to a client only those events whose minimum wagering amounts are within the client's authorized credit. As a client places wagers, the system not only automatically updates the client's credit in real time, but also updates the displayed list of events on which that client has sufficient authorized credit to wager. Thus, as a client's credit increases, more events on which to wager may be shown. Conversely, as a client's credit decreases, less events on which to wager may be shown. Alternatively, the system can also display other wagers regardless of whether the client's authorized credit meets their minimum wagering amounts. Such other wagers may include the most popular one, a reference set of wagers (e.g., the DJIA and the FTSE with respect to a wager on the price of IBM stock at the end of the month), a wager that is being promoted, wagers likely to be of interest to the client in view of the client's past wagering activity, or wagers in accordance with a client's customized display (described further below).

Figure 3:
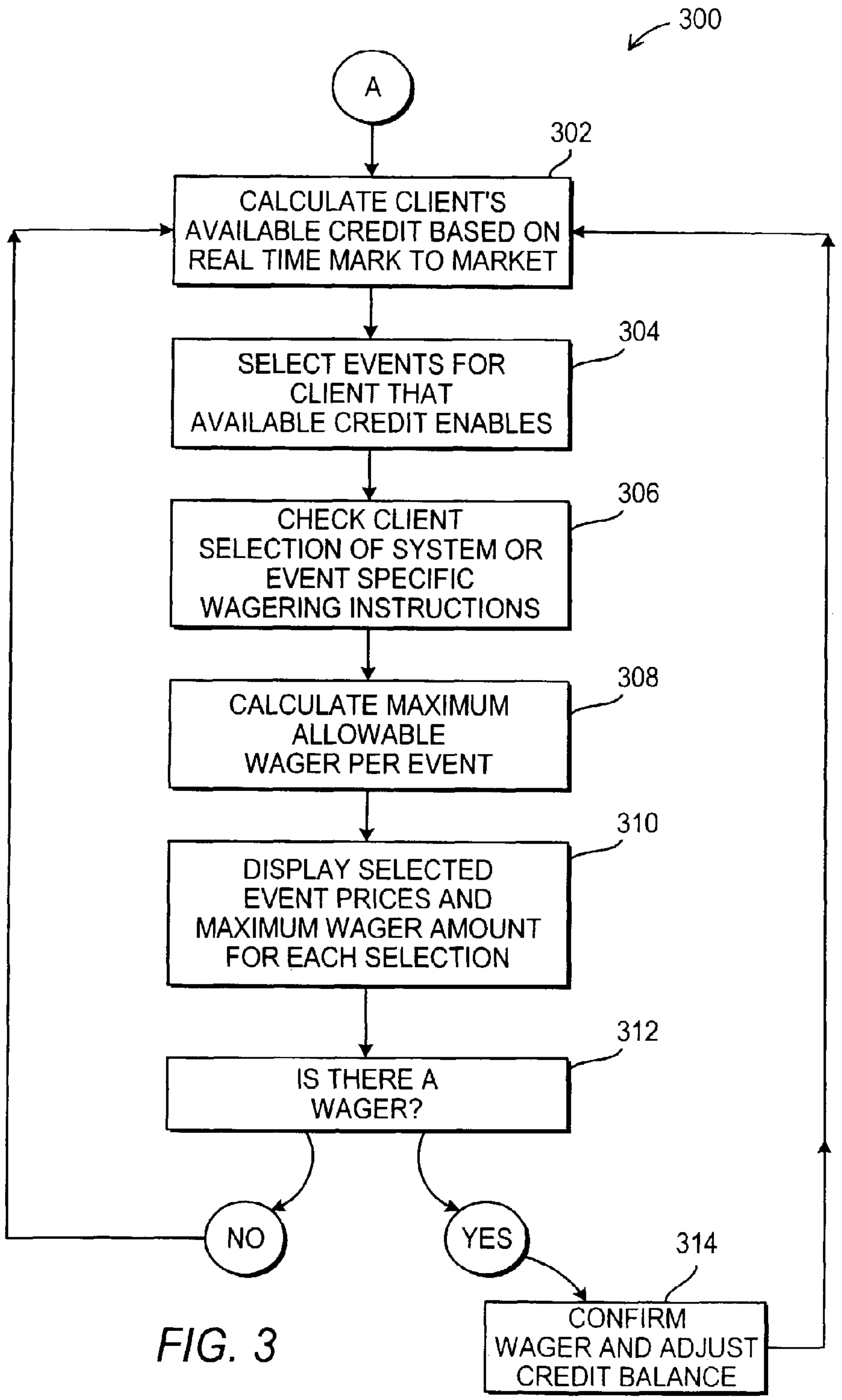
FIG. 3 is a flow diagram of a client credit management process in accordance with the present invention.

FIG. 3 shows an embodiment of a client credit management process 300 according to the present invention. The system determines a client's current available credit at 302. If the client's credit is based upon securities or other variable assets, the current market values of those securities or other assets are ascertained to determine the client's available credit. At 304, the system selects wagerable event outcomes whose minimum wagering amounts do not exceed the client's current available credit. If the client has provided instructions customizing the selection of wagerable event outcomes, at 306, those wagerable event outcomes not in accordance with the client's instructions are removed from the selection of event outcomes. At 308, the system calculates a preferably maximum amount that the client is authorized to wager for each of the selected wagerable event outcomes. At 310, the selected wagerable event outcomes and their respective authorized wager amounts are displayed to the client. At 312, if a request to wager is not received within a predetermined time period, the system returns to 302. If a request to wager is received, at 314 acceptance of the wager is confirmed and the client's available credit is substantially immediately adjusted. The system then returns to 302.

The system preferably also includes a reward feature that in accordance with house criteria rewards clients with either additional credit or other types of gifts. House criteria for distributing rewards may include, for example, placing a certain number of wagers within a specified period of time, placing wagers on certain events, or wagering or winning certain amounts. The house may also wish to console clients who have recently lost a wager by increasing their credit or providing some other reward.

The system displays wagerable events, current wager prices, and preferably other market data. The displayed information is preferably customizable. For example, a client may wish to see only wagerable events of interest (e.g., basketball events) or only those events upon which that client has placed wagers. For clients who have not customized their display, the house can initially set and then later modify display defaults in accordance with house policies and objectives. Moreover, the house can optionally override a client's display defaults either temporarily or permanently to notify a client of, for example, new wagerable events or special wagering prices of events not displayed by that client.

Displayed wager prices are updated in real time as price changes occur. To ensure that displayed pricing information and market data based on existing markets are accurate, the system corroborates displayed data with preferably multiple electronic feeds from at least two sources where possible. Because data from multiple sources are not likely synchronized with respect to time, the system preferably performs such synchronization. If prices from multiple sources do not agree with each other after synchronization, the system may widen the spread, cancel bids/offers, or not accept any further wagering. This feature can advantageously avoid potentially costly errors.

The system provides each client with a customizable preferably single display that shows, for example, various wagerable events on which that client can wager, prices for those events, applicable maturity (e.g., end of day, end of quarter, etc.), and authorized funds with which that client can wager. The maturity of an event outcome is the time, date, or time and date on which a wager on that event outcome concludes. For example, an event outcome may be a casino's slot machine payouts and its maturity may be every hour on the hour each day. The status of an event outcome at it's maturity determines the outcome of wagers placed on that event.

Wagers can be of at least two types—a fixed-odds wager or a spread-bet wager. A fixed-odds wager involves a fixed amount wagered on an event outcome that matures on a predetermined future date and time. For example, the house acting as a dealer, or another wagerer with the house acting as a broker, may offer 10:1 odds that the S&P 500 index will not exceed a certain level as of 4:00 p.m. on a certain day. A client may then wager a fixed amount that the S&P will exceed that level. At the maturity date and time, the client will either lose the wagered amount or win 10 times the wagered amount. Thus, in this type of wager, the client's stake (i.e., the wagered amount) is fixed, and the risk to both the client and the dealer or other wagerer is known.

A spread-bet wager involves a fixed amount wagered on each incremental movement of a continuous event (e.g., a stock price, the S&P 500 index, etc.) until a predetermined maturity (e.g., end of day, week, or quarter). For example, assume the wagerable event is the movement of Index X until the end of the current quarter. The current price of Index X is $1500. The house may set an offer price of $1505 and a bid price of $1495, and the wager may be $100 per tick (a tick is the smallest incremental movement of an event). To wager that Index X will rise, a client "takes" the $1505 offer. For each tick rise in Index X, the client's stake increases $100; for each tick drop in Index X, the client's stake decreases $100. To wager that Index X will drop, a client "hits" the $1495 bid. Accordingly, for each tick drop in Index X, the client's stake increases $100; for each tick rise in Index X, the client's stake decreases $100. Potential winnings are for the most part unlimited, subject only to the amount of favorable movement of the continuous event until maturity, while losses are generally limited to the client's maximum credit.

To hedge a spread-bet wager before maturity (e.g., because a client is losing too much), the client can place an opposite wager. For example, if the original wager involved the price rise of XYZ stock by the end of the quarter, but after the first week, the price drops precipitously, the client can hedge that wager by placing (quickly) another wager that the price of XYZ will drop by the end of the quarter. Thus, any additional losses incurred in the original wager will be substantially offset by gains made on the hedged wager. Similarly, however, should XYZ stock reverse direction before the end of the quarter, any gains made on the original wager will also be substantially offset by losses incurred in the hedged wager.

In another embodiment of the invention, a cap and collar system could be offered to clients as another way to hedge a spread-bet wager. With the cap and collar system, a client would agree to a limit on potential gains, (i.e., a cap), in exchange for a limit on potential losses (i.e., a collar). The cap would be calculated based on a number of elements (i.e., the spread, the collar, the predetermined risk criteria, the client, and the market volatility).

While the cap and collar system places a limit on potential gains, it has certain advantages over other methods of hedging spread-bet wagers. For example, the cap and collar system is not as subject to the risks of a volatile market. If a market drops in price rapidly, an opposite wager might not be transacted quickly enough to prevent a sizeable loss. However, since the collar is established at a set amount, the maximum size of a potential loss is guaranteed. Additionally, in the case of a market that drops in price and then recovers, placing an opposite wager would result in an overall loss for the wager, whereas hedging via the cap and collar system would result in an overall gain. Finally, the cap and collar system is simply the most straightforward way to limit risk for multiple spread-bet wagers.

After a client enters one or more wagers on one or more selected events, the transaction is confirmed in real time. Substantially no processing delays are incurred primarily because the client has already been qualified and the selected events and wagered amounts have already been authorized.

If a wager price should change as a client places a wager, the system will prompt the client to confirm acceptance of the price change. This price retention feature is implemented substantially as described in U.S. patent application Ser. No. 09/553,423, filed Apr. 19, 2000, entitled "SYSTEMS AND METHODS FOR TRADING", now U.S. Pat. No. 7,392,214, which is hereby incorporated by reference, but in the context of online interactive wagering.

FIGS. 4-8 show embodiments of interactive display screens according to the present invention as a wager is being placed.

Figure 4:
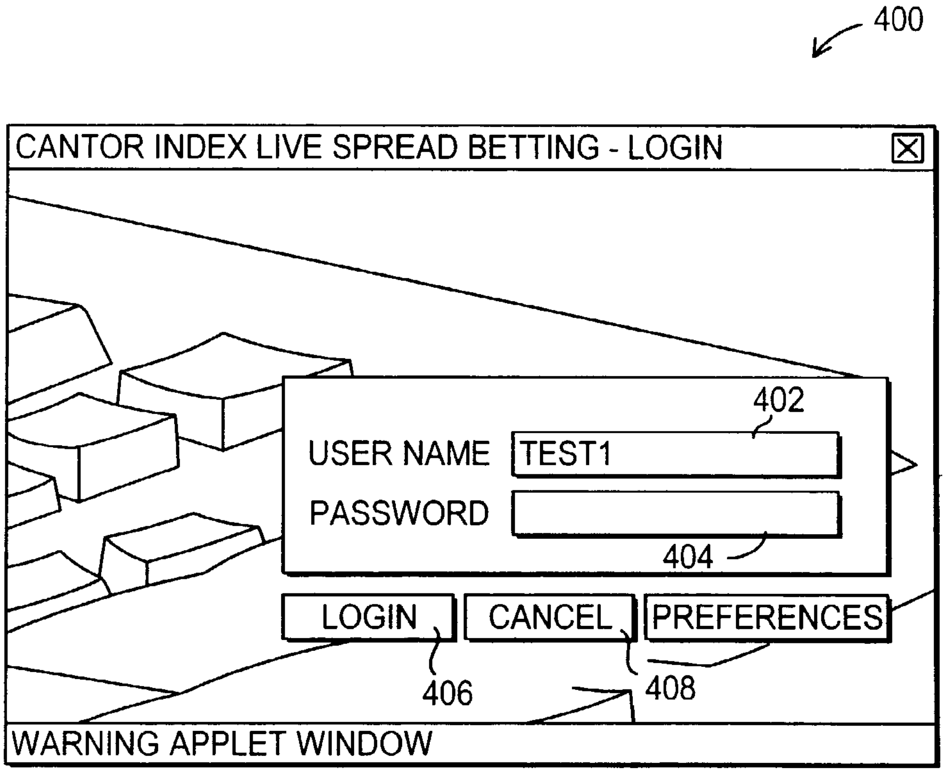
FIGS. 4-8 are a series of screen displays illustrating an interactive wager transaction in accordance with the present invention.

FIG. 4 illustrates a representative login screen 400 according to the invention. A client logs in to the system before placing wagers. The client enters a user name in data entry field 402 and a password in data entry field 404. The client then selects login button 406 to submit the user name and password to the wagering system. Alternatively, the client can select cancel button 408 to exit login screen 400 without logging in to the system.

Figure 5:
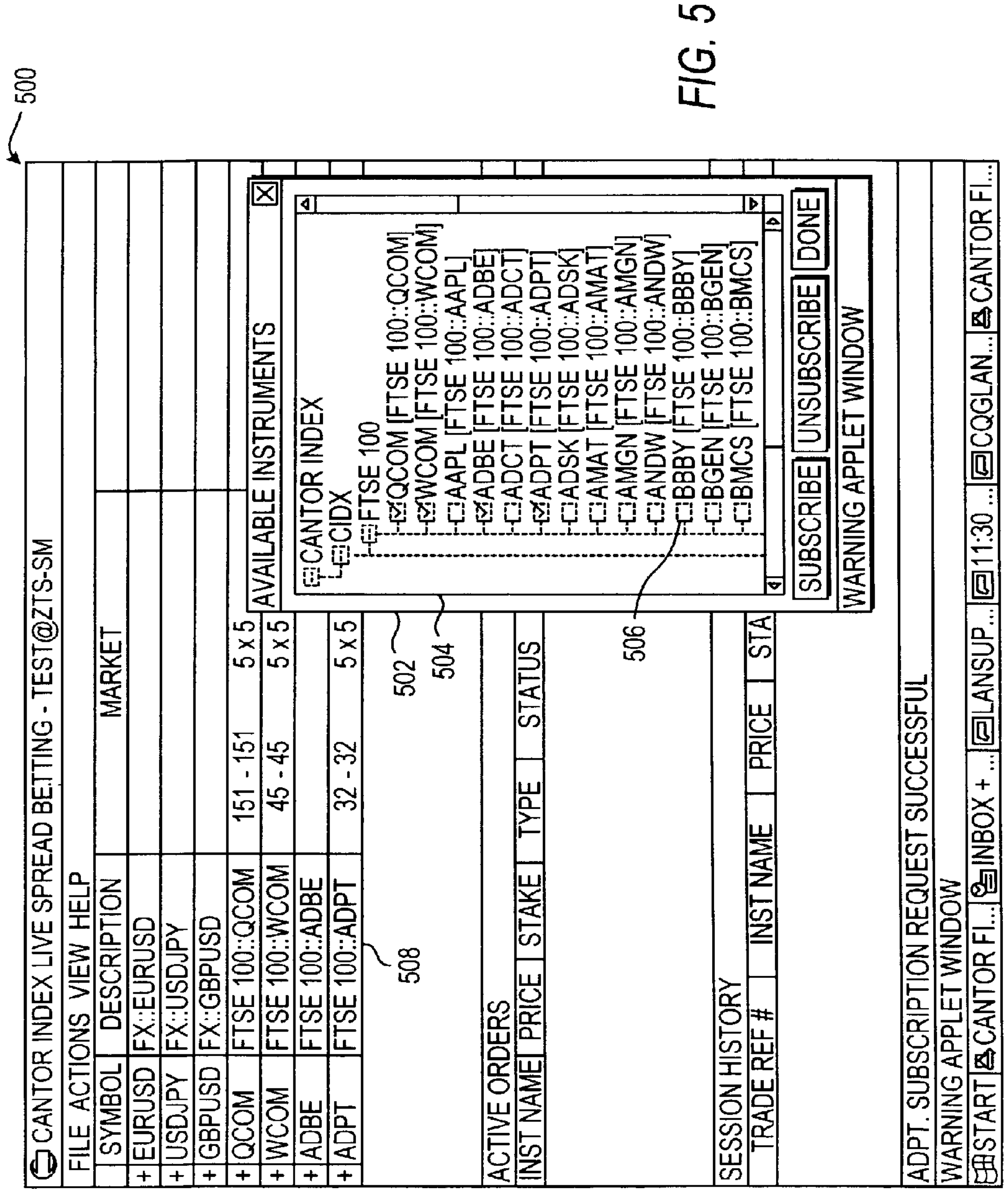

FIG. 5 illustrates a representative screen display 500 according to the invention shown after a client has logged in to the system. Pop-up screen 502 contains a scrollable list 504 of wagerable event outcomes on which the client is authorized to wager. The client may select a check box 506 next to a corresponding wagerable event outcome that the client wishes to add to a list 508 of previously selected wagerable event outcomes currently being monitored on screen 500. To place a wager on an event, the client may, for example, double-click on a wagerable event outcome from list 508 to enter wagered amounts and other information as required.

Figure 6:
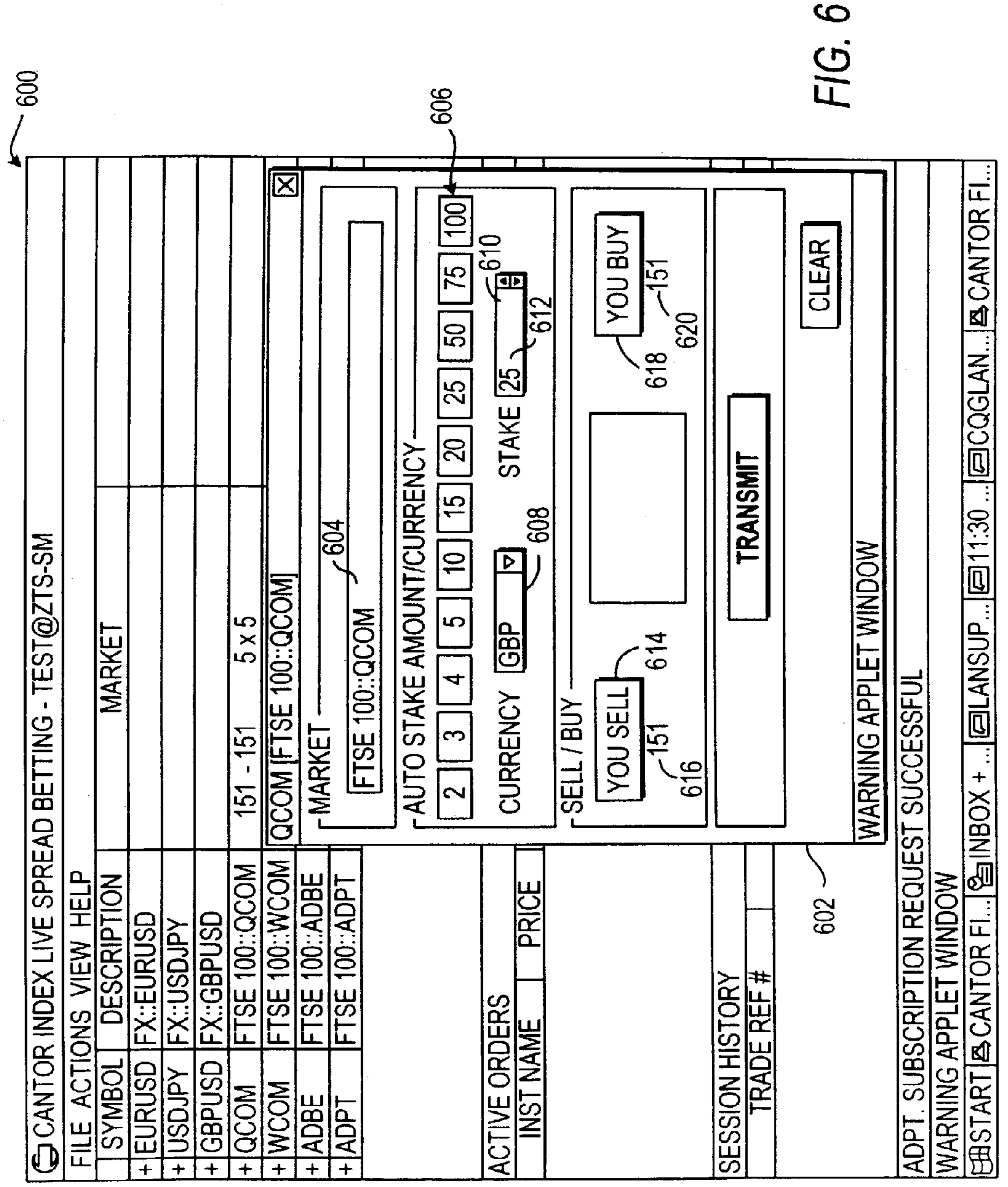

FIG. 6 illustrates a representative screen display 600 according to the invention shown after a client has double-clicked on a wagerable event outcome on list 508. A pop-up screen 602 displays the following: the name of the double-clicked wagerable event outcome in display field 604, a series of buttons 606 representing preset wager amounts, a drop-down list 608 for selecting a desired currency in which to wager, a stake data entry field 610 where the client can enter a wager amount 612 as an alternative to selecting one of wagering amount buttons 606, a sell button 614 and a corresponding sell price 616, and a buy button 618 and a corresponding buy price 620.

Figure 7:
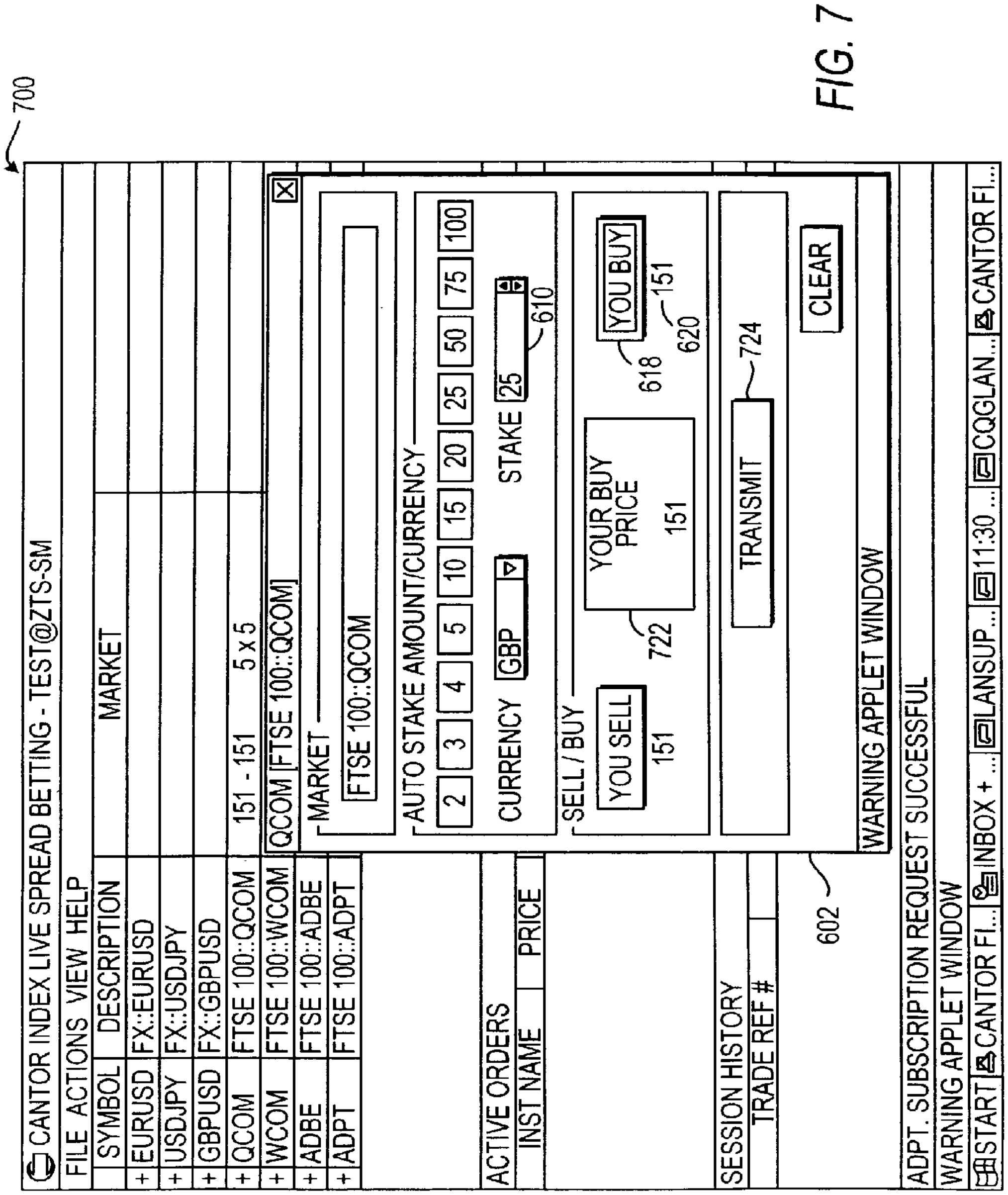

FIG. 7 illustrates a representative screen display 700 according to the invention showing pop-up window 602 after a client has entered an amount of "25" into stake data entry field 610 and selected buy button 618. After the client clicks on buy button 618, buy price 620 is indicated in field 722 and transmit button 724 is enabled.

Figure 8:
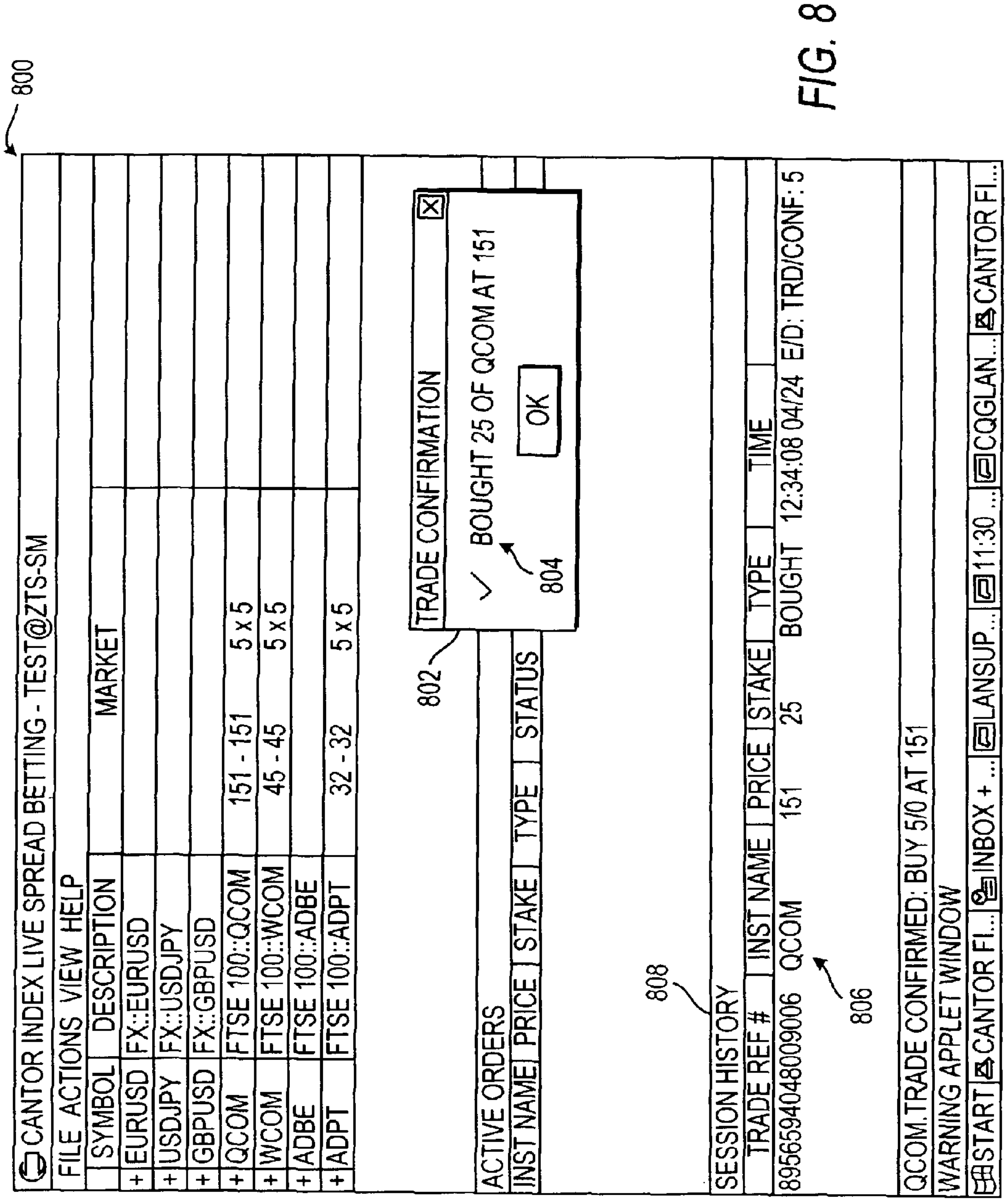

FIG. 8 illustrates a representative screen display 800 according to the invention shown after a client clicks on transmit button 724 of FIG. 7. Pop-up window 802 advantageously provides in real time a confirmation message 804 that wager 806 has been accepted. Wager 806 is displayed in session history display 808.

Note that in each of the above screen displays, alternatives to the pop-up windows can be used to display and enter the information shown.

To help manage both clients' and dealer's risk, the system preferably includes index processing capabilities that provide numerous automatic wager-tracking indices to monitor wagering activity and market or event performances. For example, the system can indicate how many wagers have been placed, how much has been placed, and on what they have been placed. Historical and current results of placed wagers (e.g., how much has been won and lost) along with any other data related to wagered events can also be indexed and displayed. Moreover, clients can create customized indices and customized displays of indices. For example, a client can customize and display an index showing the client's win-loss ratio over the last 20 wagers or the last month. Advantageously, displayed indices are updated in real time as new information is entered or received by the system. As a default, the house determines what indices are available to clients.

The system also preferably provides automatic verbal language translations of displayed indices and other information (e.g., "Clients are buying event #1," or "1000 wagers placed on event #2"). Text versions of displayed indices are preferably automatically provided in a client selected language.

Figure 9:
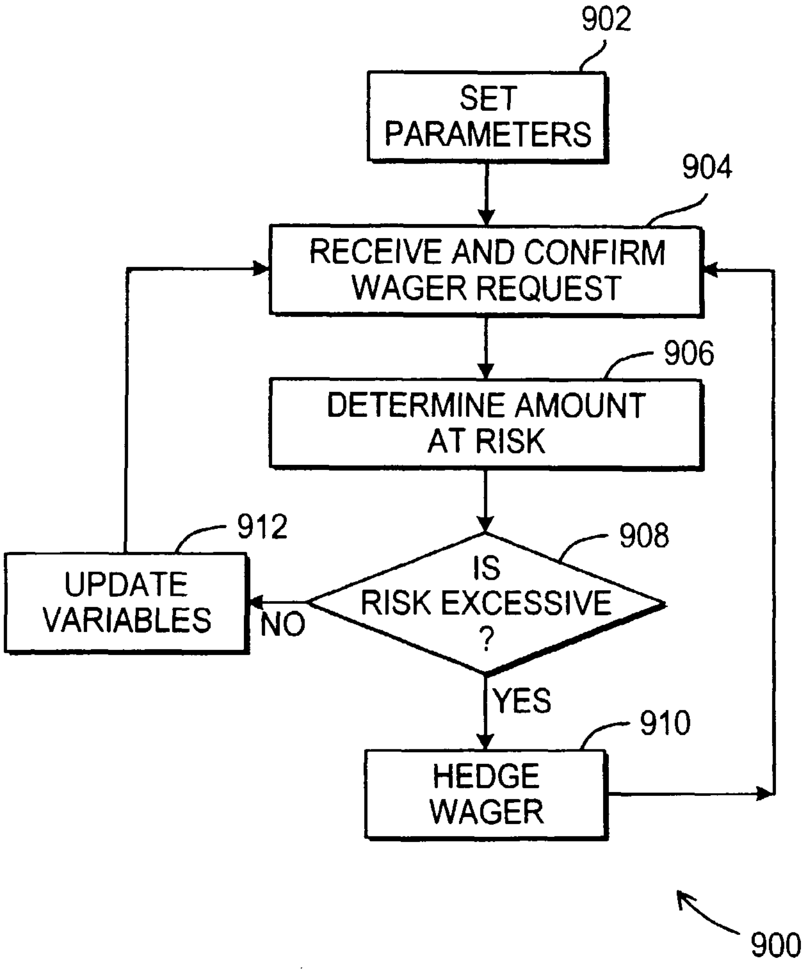
FIG. 9 is a flow diagram of an automatic hedging process in accordance with the present invention.

The system preferably hedges automatically in response to client wagering. FIG. 9 illustrates a hedging process 900 according to the invention. Generally, hedging is a strategy used to offset investment risk. For example, if clients are wagering heavily that the price of oil will increase to a particular level, the house may buy one or more options or futures contracts to hedge the positions taken by clients. The system initially sets hedging parameters at 902 in accordance with the amount of risk the house is willing to take. As wagers are placed at 904, the system at 906 automatically analyzes wagering data and applicable market conditions and determines whether the house should hedge and, if so, by how much and in what markets. Preferably, the system's hedging analysis also takes into account the skill of particular clients (e.g., via past performance) and the size of their wagers. For example, if a known client wagers a large amount, and that client is more likely to win than lose based on that client's past performance, the house may hedge sooner or more substantially than if that client were more likely to lose.

If the system at 908 determines that the house should hedge, it may go to one or more preferably correlated markets and automatically complete one or more transactions. If no market is available or appropriate to sufficiently hedge client positions, the system may hedge by increasing the price spread or by choosing to show only bids or only offers. If the system determines that hedging is not necessary, no hedging transactions will be executed. However, hedging variables will be updated at 912 to reflect current client positions, and hedging orders may be readied for immediate execution should client positions move such that hedging becomes necessary.

For each event in which wagers can be placed, the system initially sets a spread (i.e., sets bid and offer prices) and then dynamically resets and skews the spread where appropriate in accordance with the house's policies and objectives as wagers are placed. System 100 preferably includes a neural network (i.e., a learned algorithm; not shown in FIG. 1) that bases a spread on market conditions, past performance, and other data, such as, for example, current market volatility, current direction of the market, underlying position of the house, amount and direction of the most recent wagers, liquidity of market, and liquidity of hedging markets. Accordingly, spreads can be increased, decreased, or skewed (i.e., shifted such that the actual wager price is no longer in the center of the spread). The neural network balances the need to ensure an adequate profit, thus preferably avoiding too narrow a spread, versus the need to attract clients, thus preferably avoiding too wide a spread. For example, an initial spread for a particular event outcome may be set at a bid of 5 below and an offer of 5 above the actual price. Thus, if the actual price is $105, the bid price is $100 and the offer price is $1110. If the market for that event outcome moves rapidly upward (e.g., because many are bullish), the system may skew the spread upward, setting the bid price at 1 below and the offer price at 9 above the actual price. Alternatively, because wagerers tend to be contrarians, the system may skew wager prices contrary to the direction of the underlying market.

The house can also use this feature to offset either its own or its clients' performance in one market by dynamically adjusting the spread in other markets. Thus, this feature gives the house an opportunity to control profit.

Additionally, the system preferably offers multiple pricing of wagerable events. That is, the system can customize the price spread of an event to individual clients or groups of clients in accordance with, for example, credit quality, number of wagers placed, size of wagers, or wager performance. For example, the system may discount wager prices to a client who has recently suffered several losses. Similarly, the system may discount prices or add a premium to clients who wager large amounts.

The system of the present invention preferably operates 24 hours/day, 7 days/week. This allows clients to wager at their convenience. However, many of the existing markets upon which wagerable events may be based are operated at only certain times on certain days. Clients interested in obtaining prices from those markets for specific current or future dates may not be able to get those prices either because the particular market is closed at the time of the inquiry or because that market did not quote prices for that specific date.

Advantageously, the system automatically calculates a value for the requested wager price for the requested date using established prices from known market dates and other market information. In particular, the system preferably calculates wager prices by correlating prices of different, but preferably related, markets where possible. This helps to forecast the direction of the closed market and thus determine a reasonable requested wager price. For example, if a client requests a price from the FTSE market, but that market is currently closed, the system may calculate a price based on a currently open market, such as, for example, the DJIA, and its correlation with the FTSE. Other data such as the placement of the most recent wagers and known carrying-costs (e.g., interest, dividends, commodity storage charges, etc.) are also preferably included in the calculation of unavailable wager prices.

The system preferably automatically helps clients control risk. The house, a client, or both can enter instructions (e.g., criteria) into the system defining, for example, when too much has been wagered or lost. If the criteria is met during wagering, the system can warn or prevent the client from wagering further. For example, the house may have the system warn a client when the client loses over 40% of his credit in 4 hours. A client may decide that the system should halt the client's wagering when the client loses 50% of his credit in 1 hour. Moreover, should the client's criteria be met, the system will not only prevent the client from continued wagering, but preferably will take the client out of the online wagering environment and provide the client with a pre-selected non-wagering environment. For example, clients may indicate that when a wagering limit is reached, they would like to see a display of a specific picture (e.g., of their family). Or, they may want to play video games or be put in an online chatroom, etc. This change of atmosphere away from the wagering environment provides clients with a cooling off period in which they can reassess their wagering activity and results.

The system preferably also includes an automatic stop-loss feature in which clients can enter specific criteria into the system that will invoke stop-loss wagering. Upon invocation, this feature automatically places offsetting wagers to offset, for example, a client's losses from previously placed spread-bet wagers. Preferably, an automatic readjustment mechanism regulates in real time combinations of stop-loss features (e.g., raising one and lowering another in a two wager client profile).

The system preferably allows clients to select particular currencies when placing wagers and when receiving proceeds from successful wagers. Clients can thus additionally take on currency exchange risk. The currency chosen by a client when placing a wager may be different than the currency chosen at pay-out. For example, a wager can be placed in euros and paid out in U.S. dollars. The currency to be paid-out and place of payment can be selected at any time during the wager or at time of payment.

At a specified time (e.g., every hour, every day, after the outcome of a specific event, etc.), the system determines settlement prices based on predetermined criteria. This "marking to market" process fixes a price for a wagerable event outcome or ends a wager. Final wager prices can be based on, for example, event market conditions, which in turn may be based on the number of wagers placed, the amounts of the wagers, the win-loss ratio of placed wagers, and the potential amounts that stand to be won or lost.

To facilitate wagering at remote workstations, clients can be optionally issued a universal wagering debit-type card that contains identification and financial information, including authorized credit. A client preferably initiates a wager by first inserting the card into a card reader at a workstation, which then preferably establishes communication between the client and the house. This can be done instead of or subsequent to the login process described above. Each time a client transacts a wager, the master financial information files maintained by the system are updated. When the client is finished wagering, the financial information on the client's card is updated and the card is ejected from the card reader. Alternatively, the card can be swiped once to establish communication with the house and swiped again to debit the card with each contemplated wager before that wager is submitted. Upon winning a wager, the card can be swiped to credit all or part of the amount won. As another alternative, the card can be fabricated with an electronic transmitter/receiver circuit that automatically initiates communication with the house and receives transmitted updated financial information at an appropriately equipped workstation.

Other features of the wagering card according to the invention preferably include issuing the card anonymously with prepaid credit (e.g., to be given as a gift). Upon the prepaid card's first use by a client (after preferably logging in as described with respect to FIG. 4), the system's master financial files are updated. The card can be preferably used at banks to obtain cash (e.g., up to the authorized credit amount), and used in traditional financial transactions (e.g., to buy shares of stock at a conventional brokerage firm). The card can also be preferably independently updated with an increase in credit at, for example, a financial institution that may have a relationship with the house. The newly updated credit encoded on the card can later be transmitted (e.g., upon insertion into a card reader at a workstation) to the system's master financial files, or the credit can be maintained on the card and debited or credited on a transactional basis. The card can further be preferably used to wager even though access to the system's master financial files is currently unavailable (e.g., because of some technical reason).

The system preferably evaluates client requests for wagering on events that may not be based on an existing market, such as, for example, a particular athlete's likelihood of winning a gold medal at the next Olympics or a casino's likelihood of paying out more than particular amount at roulette over a certain period. If the house approves wagering on a client requested event, the system will establish that event as wagerable by, among other things, determining spreads, establishing customizable indices, and notifying all or selected clients of the new event.

The system preferably includes quantification processing capabilities that establish wagers for various events. For example, a client may request a wager that damage from a particular hurricane will exceed $5 billion dollars. Before establishing the $5 billion in hurricane damage as a wagerable event, the system preferably analyzes available data to determine whether the $5 billion is a feasible amount on which to accept wagers (i.e., within the risk tolerance of the house). The available data that may be analyzed may include, for example, the hurricane's current strength, current location, and targeted onshore arrival location, and amounts of damage caused by past hurricanes of similar strength and circumstances. This feature can be used, for example, by the insurance industry to hedge potential losses from such an event.

In another embodiment of the present invention, the house may not only act as a dealer to one-sided wagers (i.e., wagers between clients and the house), but may also act as a broker to two-sided wagers (e.g., wagers between clients, between clients and other houses, and between other houses). In this environment (also known as an exchange environment), the system allows qualified clients or dealers (other houses) to enter bids and offers to be displayed to other clients or dealers, and enables each house to control dealer risk.

The brokerage environment of the present invention preferably includes the following features: a participant qualification state, an instrument creation state, a bid/offer state, a "when" state, a qualified workup state, a price retention state, a price improvement state, a request for market state, a restore state, a price generation state, a position conversion state, and a marking-to-market state. These features are implemented substantially as described in the aforementioned U.S. patent application Ser. No. 09/553,423, but in the context of online interactive wagering.

Moreover, the brokerage environment of the present invention also preferably includes the following features: an order gathering state, a marketing making state, a trade order allocation state, a multiple wagering state, and a request for size state. These features are implemented substantially as described in U.S. patent application Ser. No. 09/593,554 entitled "SYSTEMS AND METHODS FOR ELECTRONIC TRADING THAT PROVIDE INCENTIVES AND LINKED AUCTIONS," filed on Jun. 14, 2000, now U.S. Pat. No. 7,401,044, which is hereby incorporated by reference, but in the context of online interactive wagering.

In another embodiment of the present invention, the house may allow clients the option of remotely participating in live casino games. A client connecting to the system through a workstation or other suitable hardware would be able to participate remotely in a live casino game.

This system and method could allow a client to remotely participate in casino games in any available casino, but preferably this system would be a closed system that would operate strictly within a particular casino. According to this embodiment, each hotel room (as well as other areas of the hotel and resort) would have a workstation or a television properly equipped to interface with the system. A client would then be able to participate remotely in real-time interactive casino games without actually being present in the casino.

For example, if a client wanted to participate in a craps game, the client would logon to the system from the hotel room. The client could then establish a new credit account or use an existing credit account. According to one embodiment the client's credit account could be linked to the bill for the client's room. According to another embodiment the client's credit account could be associated with an anonymous prepaid card. Once the client has fully initiated the session and has selected a specific table or table type, the client may begin to place wagers on the craps game. By preferably viewing a live video of the craps table or alternatively a live description of the action on the table, the client would place bets which would be tracked by the system. The action of the game would also be tracked by the system and all money won and lost would be reflected by the client's account.

Advantages of this system for the house include the ability to automatically monitor and track the performance of clients participating in casino games. Additionally this system would provide more opportunities for clients to participate in casino games.

Advantages of this system for the client include the ability to participate in casino games when it is inconvenient or undesirable to leave the room. Additionally the current system would allow the client abilities not available within the actual casino, such as the ability to participate in several different games at once. Certain types of rewards and benefits may also apply when remotely participating in casino games that may or may not be the same as the rewards offered on the casino floor. These rewards may include such things as: increased credit, free rooms, free room upgrades, free gifts, free wagers, credits towards the room bill, free event tickets, free transportation, free access to clubs, free meals, or any other type of similar reward or incentive.

Thus it is seen that real-time interactive wagering on event outcomes is presented. One skilled in the art will appreciate that the present invention can be practiced by other than the described embodiments, which are presented for purposes of illustration and not of limitation, and the present invention is limited only by the claims which follow.

What is claimed is:

1. A method comprising:

qualifying, by a computing device, a user of a remote client device to participate in wagering on a plurality of live casino games, wherein the wagering includes utilizing credit associated with monetary value;

determining, by the computing device, an available amount of the credit, for said wagering, of a user of the remote client device;

determining, by the computing device, the plurality of live casino games on which the user may participate for said wagering;

determining, by the computing device, a set of the plurality of live casino games on which the user is enabled to wager based on the available amount of credit, in which the user is enabled to wager the available amount of credit on a respective live casino game of the set of live casino games if the user has sufficient credit in the available amount of credit to pay a minimum wagering amount associated with the respective live casino game;

communicating, by the computing device, through a data communication interface, a listing of only information about the set of live casino games to the remote client device;

displaying, at a display device coupled to the remote client device, the listing;

communicating, by the computing device, through the data communication interface, a real-time representation of at least one live casino game of said set to the remote client device, the real-time representation comprising at least one of a multimedia format and a text format;

displaying, at the display device, the real-time representation of the at least one live casino game of said set;

receiving, by the computing device, a request from the remote client device to place a wager on a user-selected live casino game from the listing of the set of live casino games, the wager being based in accordance with the rules of said user-selected live casino game;

notifying, through said data communication interface, the remote client device whether said wager has been accepted; and facilitating, by the computing device, a purchase of a real-world financial market option or contract to hedge against the wager being won by the user, wherein an amount of said purchase is automatically increased, by the computing device, based on a historic performance of the user indicating that the user has a winning record.

2. The method of claim 1, wherein the display device comprises a workstation.

3. The method of claim 1, wherein the display device comprises a computer.

4. The method of claim 1, wherein the display device comprises a television.

5. The method of claim 1, wherein said display device is located in a hotel room.

6. The method of claim 1, wherein said data communication interface is the Internet.

7. The method of claim 1, wherein said data communication interface is an intranet.

8. The method of claim 1, wherein said data communication interface is an open system.

9. The method of claim 8, further comprising selecting a particular casino in which at least one of the plurality of live casino games occurs.

10. The method of claim 1, wherein said data communication interface is a closed system.

11. The method of claim 1 further comprising rewarding said user in accordance with predetermined wagering activity criteria.

12. The method of claim 11 wherein said rewarding comprises giving said user an increased line of credit.

13. The method of claim 11 wherein said rewarding comprises giving said user free rooms or room upgrades.

14. The method of claim 11 wherein said rewarding comprises giving said user free wagers.

15. The method of claim 11 wherein said rewarding comprises giving credits on said user's bill.

16. The method of claim 11 wherein said rewarding comprises giving said user free gifts.

17. The method of claim 11 wherein said rewarding comprises giving said user free event tickets.

18. The method of claim 11 wherein said rewarding comprises giving said user free transportation.

19. The method of claim 11 wherein said rewarding comprises giving said user free access to clubs.

20. The method of claim 11 wherein said reward comprises free meals.

21. The method of claim 11 wherein said predetermined wagering activity criteria includes at least one of the following:

a number of wagers placed by said user exceeding a predetermined minimum number of wagers;

said user placing a wager on a specified event;

the total value of wagers placed by said user exceeding a predetermined minimum total value amount;

said user winning an amount in excess of a predetermined amount; and said user losing an amount in excess of a predetermined amount.

22. The method of claim 1, further comprising:

determining, by the computing device, that the available amount of credit has increased;

in response to determining that the available amount of credit has increased, updating the set of live casino games to include at least one additional live casino game; and communicating, through the data communication interface, an updated listing of the updated set of live casino games to the remote client device.

23. The method of claim 1, further comprising:

determining, by the computing device, that the available amount of credit has decreased;

in response to determining that the available amount of credit has decreased, updating the set of live casino games to exclude at least one previously included live casino game; and communicating, through the data communication interface, an updated listing of the updated set of live casino games to the remote client device.

24. The method of claim 1, in which the available amount of credit is based on one or more securities owned by the user, and in which the method further comprises ascertaining the value of the securities to determine the available amount of credit.

25. The method of claim 1, further comprising:

determining, by the computing device, that an amount of time after determining the available credit has passed without receiving the request; and in response to determining that the amount of time has passed, updating the available amount of credit, updating the set of live casino games based on the updated available amount of credit, and communicating, through the data communication interface, an updated listing based on the updated set of live casino games to the remote client device.

26. The method of claim 1, further comprising:

generating an index identifying a win-loss ratio of the user over a number of prior wagers.

27. The method of claim 26, further comprising:

determining an outcome of the wager; and updating the number of prior wagers to include the outcome and to not include an oldest outcome that was previously included.

28. The method of claim 1, further comprising:

determining, by the computing device, that the user has a chance of winning the wager that is greater than a threshold percentage based on the historic performance of the user, and in which facilitating the purchase is performed in response to determining that the user has the chance.

29. The method of claim 1, further comprising adjusting, by the computing device, available wagers to other users in response to a receiving the request.

30. The method of claim 1, in which the listing includes bids that an event in at least one live casino game of the set of live casino games will happen and offers that the event will not happen, in which cost of each of a bid and an offer on the event differ by a spread.

31. The method of claim 1, further comprising:

determining, by the computing device, that the user has lost a threshold percentage of the available credit in a threshold period of time; and in response to determining that the user has lost the threshold percentage, halting the user's wagering for at least a period of time.

32. The method of claim 1, further comprising:

in response to receiving the request, placing a second wager in addition to the wager on behalf of the user without the user requesting the second wager.

33. The method of claim 32, in which the second wager includes a hedging wager on behalf of the user to stop losses possible from the wager.

34. A system comprising:

a server storage device;

a server processor connected to the server storage device, the server storage device storing a server program for controlling the server processor, the server processor, upon execution of the server program, configured to:

qualify a user of a remote client device to participate in wagering on a plurality of live casino games, wherein the wagering includes utilizing credit associated with a monetary value;

determine an available amount of the credit for said wagering of a user of the remote client device;

determine the plurality of games on which the user may participate for said wagering;

determine a set of the plurality of live casino games on which the user is enabled to wager based on the available amount of credit, in which the user is enabled to wager the available amount of credit on a respective live casino game of the set of live casino games if the user has sufficient credit in the available amount of credit to pay a minimum wagering amount associated with the respective live casino game;

communicate, through a data communication interface, a listing of only information about the set of live casino games to the remote client device;

control the remote client device to display the listing;

communicate, through the data communication interface, a real-time representation of at least one live casino game of said set to the remote client device, the real-time representation comprising at least one of a multimedia format and a text format;

control the remote client device to display the real-time representation of the at least one live casino game of said set;

receive a request from the remote client device to place a wager on a user-selected live casino game from the listing of the set of live casino games, the wagering being based in accordance with the rules of said user-selected live casino game;

notify, through the data communication interface, the remote client device whether said wager has been accepted; and facilitate a purchase of a real-world financial market option or contract to hedge against the wager being won by the user, wherein an amount of said purchase is automatically increased based on a historic performance of the user indicating that the user has a winning record.

35. The system of claim 34 in which the server processor is further configured to reward said user in accordance with predetermined wagering activity criteria.

36. The system of claim 35 wherein said rewarding comprises giving said user an increased line of credit.

37. The system, of claim 35 wherein said rewarding comprises giving said user free rooms or room upgrades.

38. The system of claim 35 wherein said rewarding comprises giving said user free wagers.

39. The system of claim 35 wherein said rewarding comprises giving credits on said user's bill.

40. The system of claim 35 wherein said rewarding comprises giving said user free gifts.

41. The system of claim 35 wherein said rewarding comprises giving said user free event tickets.

42. The system of claim 35 wherein said rewarding comprises giving said user free transportation.

43. The system of claim 35 wherein said rewarding comprises giving said user free access to clubs.

44. The system of claim 35 wherein said rewarding comprises giving said user free meals.

45. The system of claim 35 wherein said predetermined wagering activity criteria includes at least one of the following:

a number of wagers placed by said user exceeding a predetermined minimum number of wagers;

said user placing a wager on a specified event;

the total value of wagers placed by said user exceeding a predetermined minimum total value amount;

said user winning an amount in excess of a predetermined amount; and said user losing an amount in excess of a predetermined amount.

46. The system of claim 34, in which the server processor is further configured to:

determine that the available amount of credit has increased;

in response to determining that the available amount of credit has increased, update the set of live casino games to include at least one additional live casino game; and communicating, through the data interface, an updated listing of the updated set of live casino games to the remote client device.

47. The system of claim 34, in which the server processor is further configured to:

determine that the available amount of credit has decreased;

in response to determining that the available amount of credit has decreased, update the set of live casino games to exclude at least one previously included live casino game; and provide an updated listing of the updated set of live casino games.

48. The system of claim 34, in which the available amount of credit is based on one or more securities owned by the user, and in which the server processor is further configured to ascertain the value of the securities to determine the available credit.

49. The system of claim 34, in which the server processor is further configured to:

determine that an amount of time after determining the available amount of credit has passed without receiving the request; and in response to determining that the amount of time has passed, update the available amount of credit, update the set of live casino games based on the updated available credit, and communication, through the data interface, an updated listing based on the updated set of live casino games to the remote client device.

50. The system of claim 34, in which the server processor is further configured to:

generate an index identifying a win-loss ratio of the user over a number of prior wagers.

51. The system of claim 50, in which the server processor is further configured to:

determine an outcome of the wager; and update the number of prior wagers to include the outcome and to not include an oldest outcome that was previously included.

52. The system of claim 34, in which the server processor is further configured to:

determine that the user has a chance of winning the wager that is greater than a threshold percentage based on the historic performance of the user, and in which facilitating the purchase is performed in response to determining that the user has the chance.

53. The system of claim 34, in which the server processor is further configured to:

adjust available wagers to other users in response to a receiving the request.

54. The system of claim 34, in which the listing includes bid wagers that an event in at least one of the set of live casino games will happen and offer wagers that the event will not happen, in which cost of each of a bid wager and an offer wager on the event differ by a spread.

55. The system of claim 34, in which the server processor is further configured to:

determine that the user has lost a threshold percentage of the available amount of credit in a threshold period of time; and in response to determining that the user has lost the threshold percentage, halt the user's wagering for at least a period of time.

56. The system of claim 34, in which the server processor is further configured to:

in response to receiving the request, place a second wager in addition to the wager on behalf of the user without the user requesting the second wager.

57. The system of claim 56, in which the second wager includes a hedging wager on behalf of the user to stop losses possible from the wager.

58. The system of claim 34, in which qualifying the user includes logging the user into a wagering service.

59. A method comprising:

qualifying, by a computing device, a user of a remote client device to participate in wagering on a plurality of live casino games, wherein the wagering includes utilizing credit associated with monetary value;

determining, by the computing device, an available amount of the credit of a user of the remote client device;

determining, by the computing device, the plurality of live casino games on which the user may participate for said wagering;

determining, by the computing device, a set of the plurality of live casino games on which the user is enabled to wager based on the available amount of credit, in which the user is enabled to wager on a respective live casino game of the set of live casino games if the user has sufficient credit to pay a minimum wagering amount associated with the respective live casino game;

communicating, by the computing device, through a data communication interface, a listing of only information about the set of live casino games to the remote client device, in which the listing includes bids that an event in at least one live casino game of the set of live casino games will happen and offers that the event will not happen, in which cost of each of a bid and an offer on the event differ by a spread;

displaying, at a display device coupled to the remote client device, the listing;

receiving, by the computing device, a request from the remote client device to place a wager on a user-selected live casino game from the listing of the set of live casino games, the wagering being based in accordance with the rules of said user-selected live casino game;

notifying, through said data communication interface, the remote client device whether said wager has been accepted; and adjusting, by the computing device, the spread based on an output of a neural network that includes as input real-world market conditions for the bid and offer wagers and real-world market conditions for hedging opportunities.

60. A system comprising:

a server storage device;

a server processor connected to the server storage device, the server storage device storing a server program for controlling the server processor, the server processor, upon execution of the server program, configured to:

qualify a user of a remote client device to participate in wagering on a plurality of live casino games, wherein the wagering includes utilizing credit associated with a monetary value;

determine an available amount of the credit for said wagering of a user of the remote client device;

determine the plurality of games on which the user may participate for said wager;

determine a set of the plurality of live casino games on which the user is enabled to wager based on the available amount of credit, in which the user is enabled to wager on a respective live casino game of the set of live casino games if the user has sufficient credit in the available amount of credit to pay a minimum wagering amount associated with the respective live casino game;

communicate, through a data communication interface, a listing of only information about the set of live casino games to the remote client device, in which the listing includes bid wagers that an event in at least one of the set of live casino games will happen and offer wagers that the event will not happen, in which cost of each of a bid wager and an offer wager on the event differ by a spread;

control the remote client device to display the listing;

receive a request from the remote client device to place a wager on a user-selected live casino game from the listing of the set of live casino games, the wagering being based in accordance with the rules of said user-selected live casino game;

notify, through the data communication interface, the remote client device whether said wager has been accepted; and adjust the spread based on an output of a neural network that includes as input market real-world conditions for the bid and offer wagers and real-world market conditions for hedging opportunities.

* * * * *